(12) United States Patent
Choi

(10) Patent No.: US 8,798,540 B2
(45) Date of Patent: Aug. 5, 2014

(54) METHOD AND APPARATUS FOR ANTI-COLLISION TAG IN RADIO FREQUENCY IDENTIFICATION (RFID) SYSTEM

(75) Inventor: Hyun-Kuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1080 days.

(21) Appl. No.: 12/262,555

(22) Filed: Oct. 31, 2008

(65) Prior Publication Data

US 2009/0111502 A1 Apr. 30, 2009

(30) Foreign Application Priority Data

Oct. 31, 2007 (KR) .................. 10-2007-0110142

(51) Int. Cl.
*H04B 7/00* (2006.01)
(52) U.S. Cl.
USPC .............. 455/41.2; 455/41.1; 340/572.1
(58) Field of Classification Search
USPC .......................... 455/41.2; 370/445
See application file for complete search history.

(56) References Cited

U.S. PATENT DOCUMENTS

| | | | |
|---|---|---|---|
| 5,500,651 A * | 3/1996 | Schuermann | 342/42 |
| 5,548,812 A * | 8/1996 | Padovani et al. | 455/442 |
| 6,118,767 A * | 9/2000 | Shen et al. | 370/252 |
| 6,338,125 B1 * | 1/2002 | Kopser et al. | 711/150 |
| 7,002,920 B1 * | 2/2006 | Ayyagari et al. | 370/252 |
| 7,009,944 B1 * | 3/2006 | Hulbert | 370/278 |
| 7,471,641 B2 * | 12/2008 | Moon et al. | 370/252 |
| 7,649,441 B2 * | 1/2010 | Adamec et al. | 340/10.2 |
| 2001/0012758 A1 * | 8/2001 | Bradley et al. | 455/12.1 |
| 2004/0022207 A1 * | 2/2004 | Leung et al. | 370/321 |
| 2004/0179547 A1 * | 9/2004 | Kuffner et al. | 370/465 |
| 2004/0198222 A1 * | 10/2004 | Ertin et al. | 455/41.1 |
| 2005/0099302 A1 * | 5/2005 | Lieffort et al. | 340/572.7 |
| 2007/0274242 A1 * | 11/2007 | Lamacraft et al. | 370/310 |
| 2007/0286227 A1 * | 12/2007 | Koezuka | 370/445 |
| 2008/0111661 A1 * | 5/2008 | Lin et al. | 340/10.1 |
| 2008/0180222 A1 * | 7/2008 | Hollister et al. | 340/10.3 |
| 2009/0179738 A1 * | 7/2009 | Kageyama | 340/10.1 |

FOREIGN PATENT DOCUMENTS

| | | |
|---|---|---|
| JP | 2006303970 A | 11/2006 |
| KR | 100567963 B1 | 3/2006 |
| KR | 100627656 B1 | 9/2006 |
| KR | 100747758 B1 | 8/2007 |

* cited by examiner

*Primary Examiner* — Zhiyu Lu
(74) *Attorney, Agent, or Firm* — Jefferson IP Law, LLP

(57) ABSTRACT

A method and an apparatus for preventing tag collision in a Radio Frequency IDentification (RFID) system are provided. A method of a reader for preventing the tag collision in the RFID system includes modifying variables such that every tag responds in the same slot, measuring a power of tags received in the same slot, allocating slots by predicting the number of the tags based on the measured power, and reading the tags in the allocated slots.

10 Claims, 6 Drawing Sheets

METHOD AND APPARATUS FOR ANTI-COLLISION TAG IN RADIO FREQUENCY IDENTIFICATION (RFID) SYSTEM

PRIORITY

This application claims the benefit under 35 U.S.C. §119(a) of a Korean patent application filed in the Korean Intellectual Property Office on Oct. 31, 2007 and assigned Serial No. 10-2007-0110142, the entire disclosure of which is hereby incorporated by reference.

BACKGROUND OF THE INVENTION

1. Field of the Invention

The present invention relates to a method and an apparatus for preventing tag collision in a Radio Frequency IDentification (RFID) system. More particularly, the present invention relates to a method and an apparatus for predating the number of tags based on receiving power and allocating slots at a reader in the RFID system.

2. Description of the Related Art

A Radio Frequency IDentification (RFID) system is a system which provides an automatic identification method, using a barcode, a magnetic sensor, or an Integrated Circuit (IC)-card, for wirelessly retrieving data stored in microchips using microwaves or long waves. Because of its advances, the RFID technology is regarded as a replacement for the simple barcode and its use is increasing in industry.

To retrieve the data stored in the microchips, the RFID system does not need to contact a reader directly to the microchips, or to separately scan the microchips in sight using the reader. Also, the RFID system features mass data transmission.

Tag collision preventing methods of the RFID system include a deterministic method and a stochastic method. A frame slot Aloha of the stochastic method is being used.

The frame slot Aloha is a channel multiple access technology where a wireless communication device communicates data frame by frame constituted with time slots, which are regular time intervals, using a channel when a plurality of wireless communication devices sharing a single channel intends to transmit data.

With a relatively simple implementation, the frame slot Aloha may be widely adopted in wireless communications and applied to the RFID system.

When the RFID system adopts the frame slot Aloha, a response time of an RFID tag is divided into the fixed-size slots in response to a transmission command of an RFID reader, the multiple RFID tags transmit their ID number in their selected slot, and the tags are identified by constituting one frame with the multiple slots.

FIG. 1 is a diagram illustrating conventional frame slot Aloha operations.

In the basic frame slot Aloha, a frame size used in communications between the RFID reader and the RFID tags is fixed. When the RFID reader broadcasts an ID number request message to the RFID tags, the message carries information relating to the frame size and slot status to the RFID tags.

The RFID tag selects a slot to use in the frame using the information relating to the frame size and the slot status received together with the ID number request message.

Referring to FIG. 1, when the ID number transmitted by the RFID tag is received at the RFID reader without collision, the corresponding tag is identified. Accordingly, the corresponding tag is commanded not to respond to subsequent ID request messages.

Since the frame of FIG. 1 has a read cycle including three slots, the frame size is fixed. The RFID reader sends the ID number request message to five RFID tags.

Within the first read cycle, a first tag 101 and a third tag 103 send their ID numbers in a first slot 111, and a second tag 102 and a fifth tag 105 send their ID numbers in a second slot 112. In this situation, the tags collide with each other. As recognizing only a fourth tag 104 in a third slot 113 in the first read cycle, the RFID reader commands the fourth tag 104 not to respond to next ID number request message.

Since the first tag 101, the second tag 102, the third tag 103, and the fifth tag 105 are not identified in the first read cycle because of the tag collision, they randomly select a slot in the second read cycle and respond to the second ID number request message of the RFID reader. In the second read cycle, the second tag 102 and the fifth tag 105 have tag collision in a first slot 121. The first tag 101 is recognized in a second slot 122 and the third tag 103 is recognized in a third slot 123.

The basic frame slot Aloha identifies the RFID tags as stated above. When a small-size frame is used for a great number of tags, the tag reading efficiency drastically falls down because of the tag collision even through the multiple repetitions of the read cycle. When a large-size frame is used for a small number of tags, the slots are unnecessarily wasted.

To address those problems, a dynamic frame Aloha method for changing the frame size and a tag number estimation frame Aloha method have been suggested.

The dynamic frame Aloha method has many modified algorithms depending on its implementation. One of the modified algorithms increases the frame size when the number of colliding slots exceeds a certain ratio of the frame, and decreases the frame size when slots over a certain ratio are empty in the frame.

The tag number estimation Aloha method identifies tags by estimating the number of tags in the read range of the RFID reader and determining an optimum frame size. Using the slot status based on the tag collision after the read cycle, this method determines the frame size to be applied to the next read cycle.

The dynamic frame Aloha method and the tag number estimation Aloha method can enhance the tag reading efficiency by adjusting the frame size, compared to the basic frame Aloha method.

However, when the number of slots allocated by the RFID reader is greater than the number of the tags, many slots without response cause a waste of read time and power of the RFID reader. When the number of the slots allocated by the reader is smaller than the number of the tags, the tag responses collide with each other and the time and the power of the RFID reader are wasted in the re-identification.

As discussed above, to stably determine the slots, the two conventional methods are subject to the multiple frames.

SUMMARY OF THE INVENTION

An aspect of the present invention is to address at least the above mentioned problems and/or disadvantages and to provide at least the advantages described below. Accordingly, an aspect of the present invention is to provide a method and an apparatus for preventing tag collision in a Radio Frequency IDentification (RFID) system.

Another aspect of the present invention is to provide a method and an apparatus for predicting the number of tags by measuring power of tags at a reader in an RFID system.

Yet another aspect of the present invention is to provide a method and an apparatus for allocating slots based on the number of tags in an RFID system.

Still another aspect of the present invention is to provide a method and an apparatus for reading tags by changing a set power of a reader in an RFID system.

According to an aspect of the present invention, a method of a reader for preventing a tag collision in an RFID system is provided. The method includes modifying variables such that every tag responds in the same slot, measuring a power of tags received in the same slot, allocating slots by predicting the number of the tags based on the measured power, and reading the tags in the allocated slots.

According to another aspect of the present invention, a method of a tag for preventing a tag collision in an RFID system is provided. The method includes when a distance to a reader exceeds a certain distance or when a tag response power is not proportional to the distance, measuring a power of a signal received from the reader, and when the measured power lies within a tag response power range set by the reader, responding to the reader.

According to yet another aspect of the present invention, an apparatus of a reader for preventing a tag collision in an RFID system is provided. The apparatus includes a controller for modifying variables such that every tag responds in the same slot, for measuring a power of received tags, and for allocating slots by predicting the number of the tags based on the measured power, and a power measurer for measuring the power of the received tags responding in the same slot.

According to still another aspect of the present invention, an apparatus of a tag for preventing a tag collision in an RFID system is provided. The apparatus includes a controller for, when a distance to a reader exceeds a certain distance or when a tag response power is not proportional to the distance, measuring a power of a signal received from the reader and for determining whether to respond by comparing the measured power with a tag response power range set by the reader, and a power measurer for measuring the power of the signal received from the reader under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for adjusting variables to read every tag responding to a reader at the same time and allocating slots as many as tags predicted using a tag power received in a Radio Frequency IDentification (RFID) system.

Figure 1:
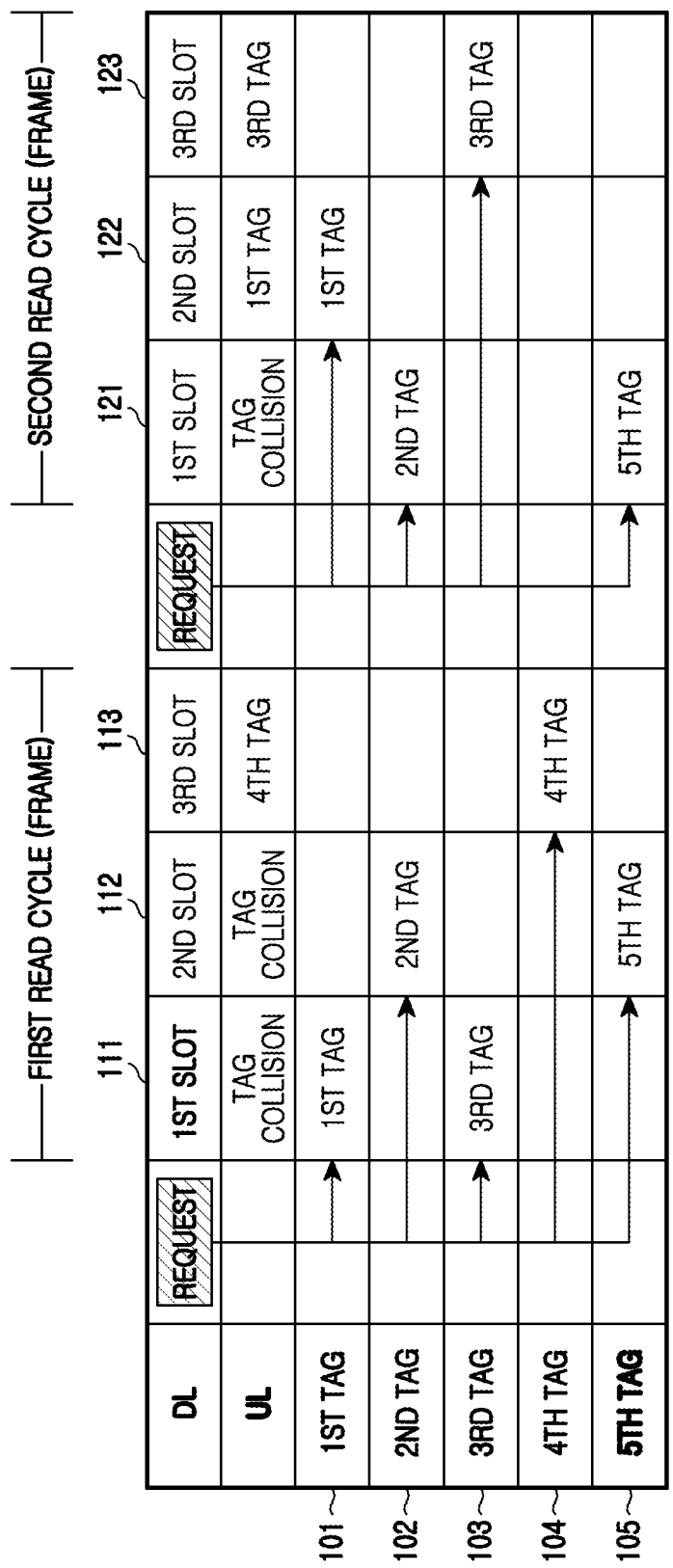
FIG. 1 is a diagram illustrating conventional frame slot Aloha operations.
Figure 2:
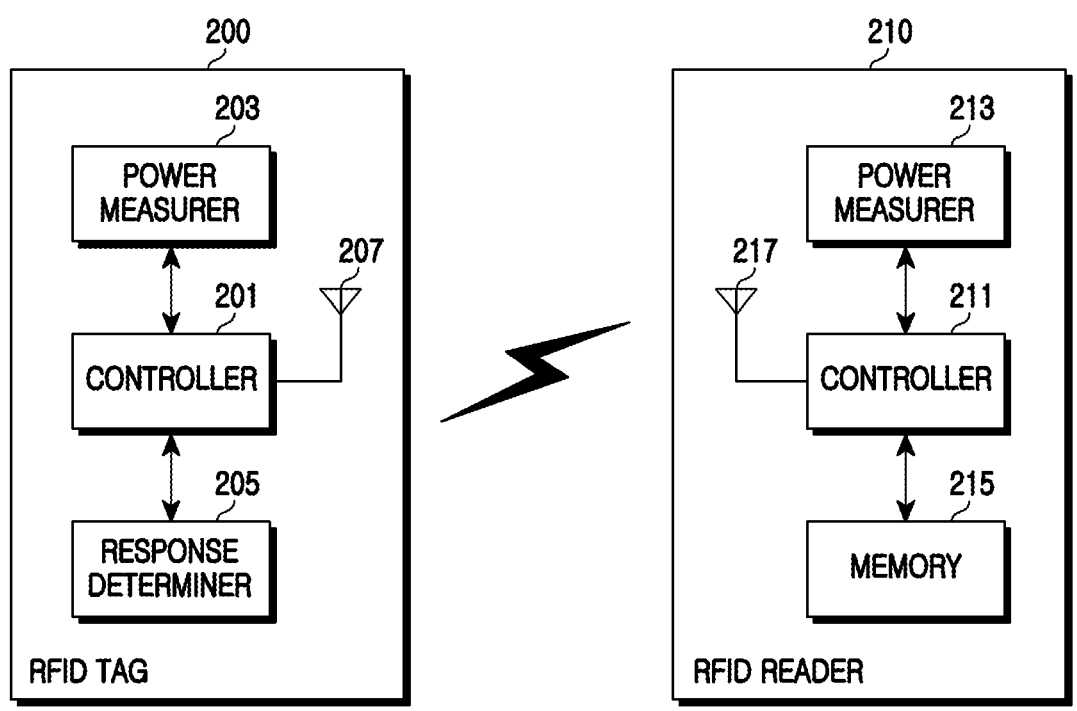
FIG. 2 is a block diagram of a Radio Frequency IDentification (RFID) system for preventing tag collision according to an exemplary embodiment of the present invention.

FIG. 2 is a block diagram of an RFID system for preventing tag collision according to an exemplary embodiment of the present invention.

Referring to FIG. 2, the RFID system includes an RFID tag 200 and an RFID reader 210. The RFID system can include one or more RFID tags and one or more RFID readers.

The RFID tag 200 can include a controller 201, a power measurer 203, a response determiner 205, and an antenna 207.

The controller 201 controls operations of the RFID tag 200. Besides conventional functions, when a distance to the RFID reader 210 exceeds 2 m or when a power of the RFID tag 200 is not directly proportional to the distance, the controller 201 controls the power measurer 203 to measure the power of the signal received from the RFID reader 210 over the antenna 207.

The controller 201 controls the response determiner 205 to determine whether to respond under a response condition based on the magnitude of the signal and a control signal received from the RFID reader 210 over the antenna 207, that is, based on the power set by the RFID reader 210.

The power measurer 203 measures the power received from the RFID reader 210 under the control of the controller 201 and provides the measured power to the controller 201.

The response determiner 205 determines whether to respond under the control of the controller 201 and provides the determination result to the controller 201.

The RFID reader 210 may include a controller 211, a power measurer 213, a memory 215, and an antenna 217.

The controller 211 controls operations of the RFID reader 210. Besides conventional functions, the controller 211 modifies variables so that every RFID tag 200 responds in one slot at the same time, controls the power measurer 213 to measure the power of the RFID tags 200 received via the antenna 217, and predicts the number of the RFID tags 200 based on the measured power. Herein, the number of the RFID tags 200 based on the measured power is predicted using a pre-calculated mapping table as shown in Table 1.

TABLE 1

| Receiving power | Number of tags |
| --- | --- |
| −25 dBm~−22 dBm | 4 |
| −22 dBm~−19 dBm | 8 |
| −19 dBm~−16 dBm | 16 |
| −16 dBm~−13 dBm | 32 |
| −13 dBm~−10 dBm | 64 |
| −10 dBm~−07 dBm | 128 |

The controller 211 allocates slots as many as the predicted RFID tags 200 and controls to read the RFID tags 200.

When the distance to the RFID tags 200 exceeds 2 m or when the RFID tag response power is not proportional to the distance, the controller 211 sets the response power of the RFID tags 200 so that only RFID tags receiving the power in the preset range from the RFID reader 210 can respond. When all of the RFID tags 200 do not read with the set tag response power, the controller 211 controls and processes to alter the set receiving power of the RFID reader 210.

The power measurer 213 measures the power of the RFID tags 200 received in one slot via the antenna 217 under the control of the controller 211.

The memory 215 contains a program for controlling the RFID reader 210, data temporarily generating in the operation of the RFID reader 210, system parameters, and various data to store. Under the control of the controller 211, the memory 215 contains the pre-calculated mapping table, which is used to predict the number of the tags based on the measured receiving power of the RFID tags 200.

Figure 3:
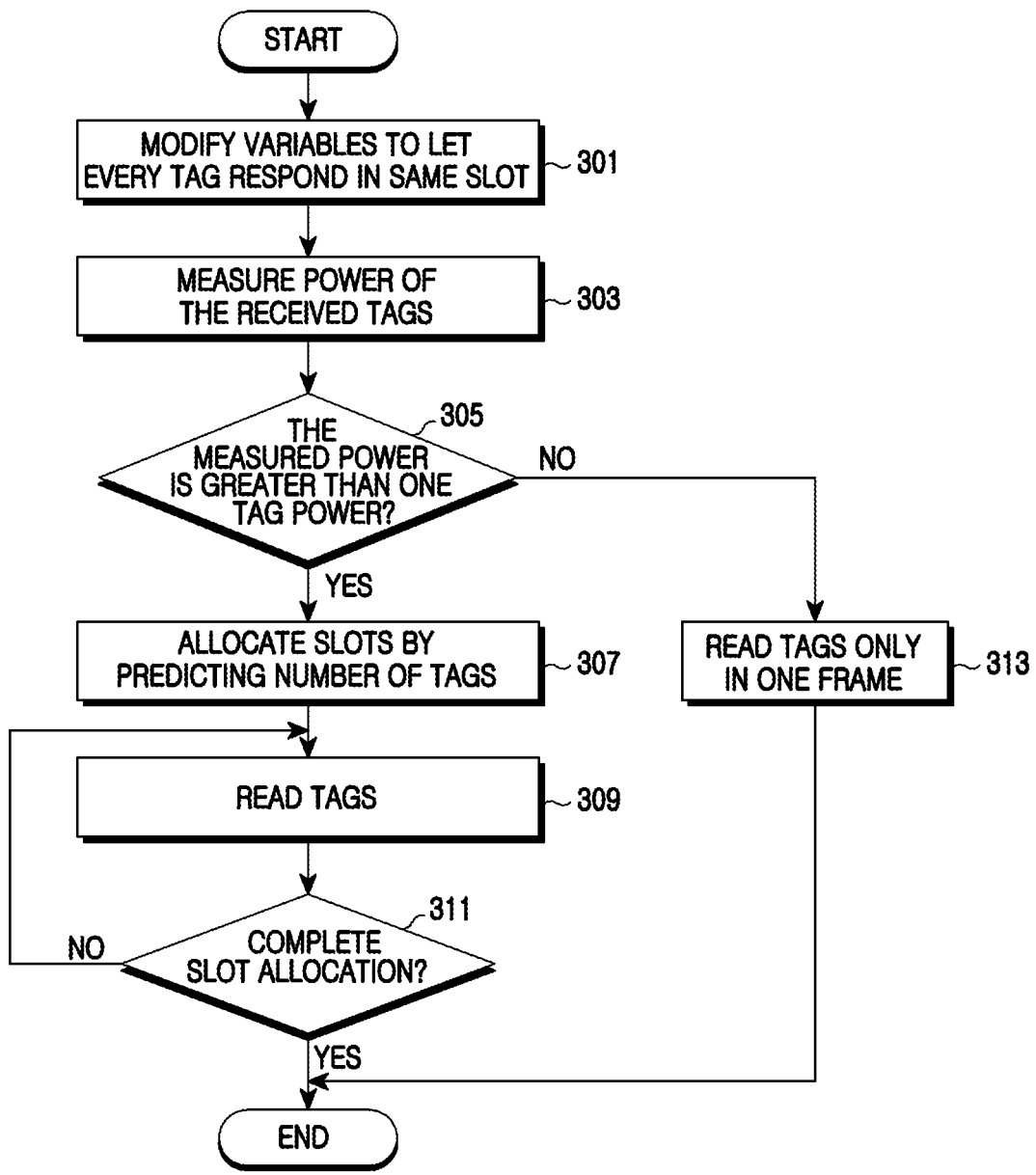
FIG. 3 is a flowchart illustrating operations of an RFID reader for anti-collision tag according to an exemplary embodiment of the present invention.

FIG. 3 is a flowchart illustrating operations of an RFID reader for anti-collision tag according to an exemplary embodiment of the present invention.

Referring to FIG. 3, the RFID reader 210 modifies the variables of the RFID such that every RFID tag responds in the same slot in step 301, that is, such that all the RFID tags received collide with each other in one slot. In step 303, the RFID reader 210 measures the power of the RFID tags received in one slot.

In step 305, the RFID reader 210 determines whether the measured power is greater than one RFID tag power. When the measured power is not greater than one RFID tag power, the RFID reader 210 reads the RFID tags only in one frame in step 313 and then finishes this process.

In contrast, when the measured power is greater than one RFID tag power, the RFID reader 210 predicts the number of the RFID tags based on the measured power and allocates slots as many as the predicted RFID tags in step 307. In step 309, the RFID reader 210 reads the RFID tags in the allocated slots.

Figure 6:
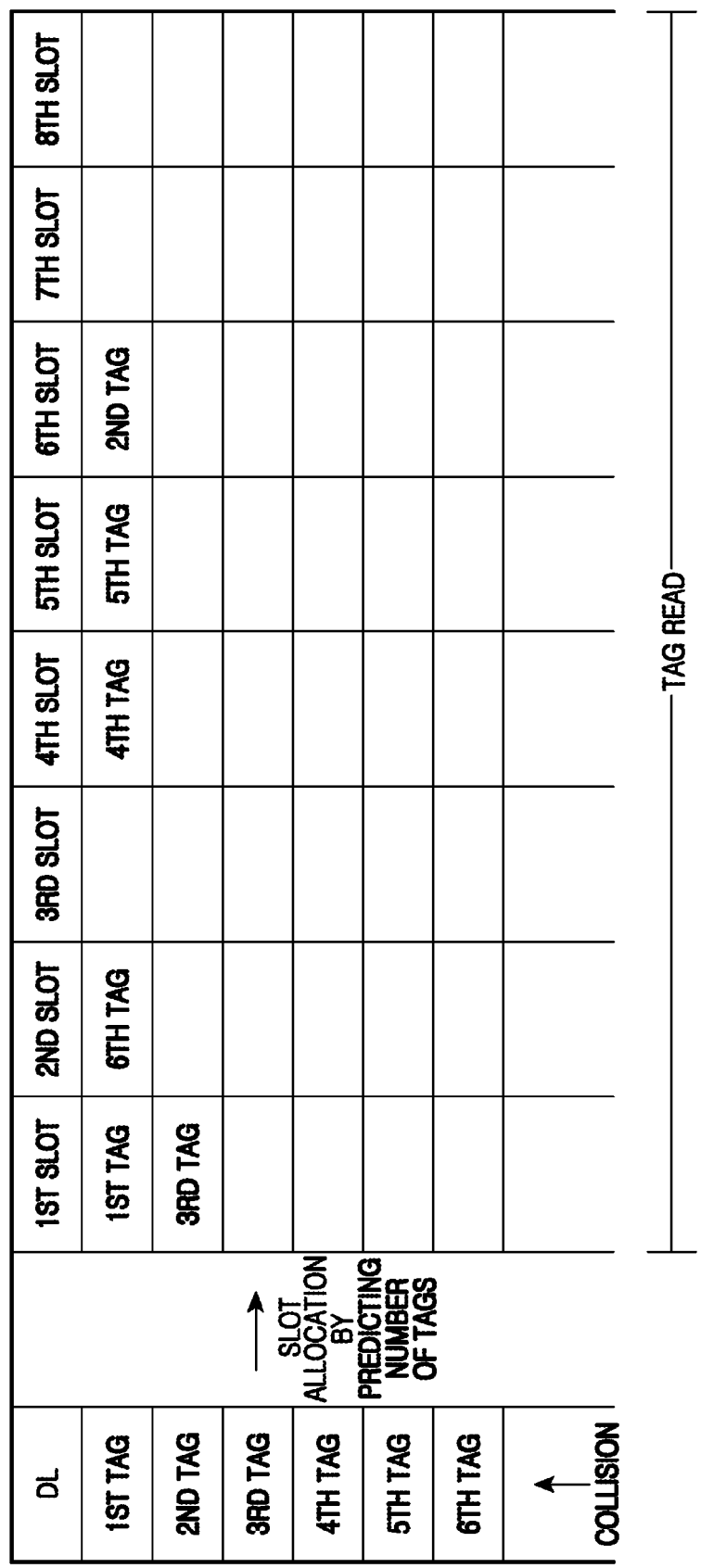
FIG. 6 is a diagram illustrating a method for predicting the number of tags based on measured power according to an exemplary embodiment of the present invention.

In an exemplary implementation, the RFID reader 210 defines the variables such that every RFID tag can response in the first slot as shown in FIG. 6 and then measures the power of the received RFID tags. Next, the RFID reader 210 predicts the number of the RFID tags based on the measured power using the pre-calculated mapping table of Table 1, allocates slots, and reads the RFID tags.

In step 311, the RFID reader 210 determines whether the slot allocation is finished. When the slot allocation is not finished, the RFID reader 210 returns back to step 309.

When the slot allocation is completed, the RFID reader 210 finishes this process.

Figure 4:
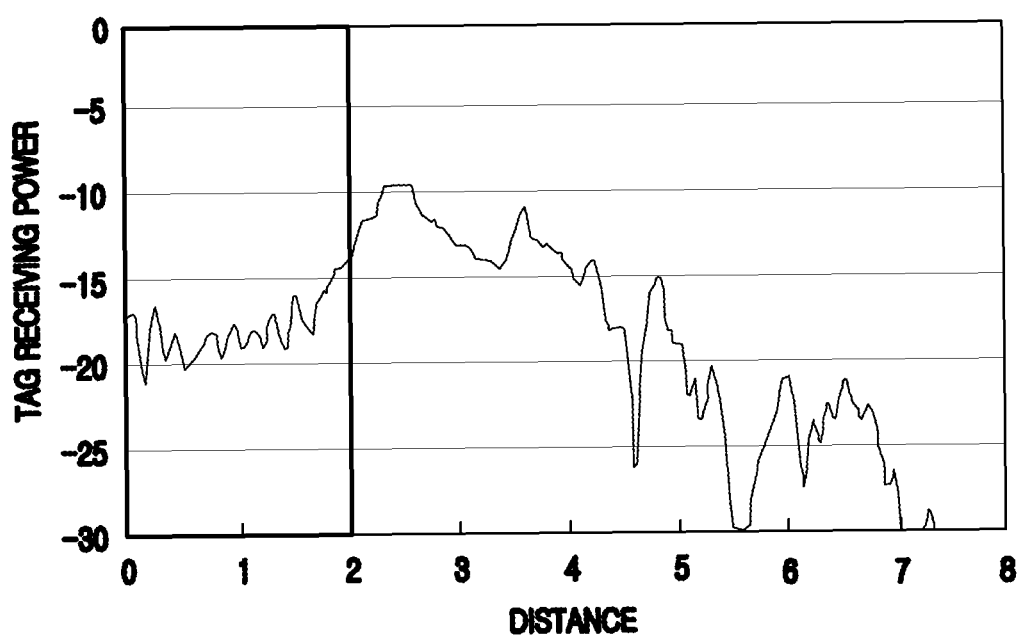
FIG. 4 is a diagram illustrating a response power of a single tag according to an exemplary embodiment of the present invention.

FIG. 4 is a diagram illustrating a response power of a single tag according to an exemplary embodiment of the present invention.

Referring to FIG. 4, it is estimated that the present invention is effective when the distance between the RFID reader and the RFID tag lies within 2 m. Therefore, when the distance between the RFID reader and the RFID tag exceeds 2 m or when the response power of the RFID tag is not proportional to the distance, the RFID reader may set the receiving power of the RFID tag and make a condition such that only RFID tags within the set power can respond.

In what follows, it is assumed that the tag can measure the signal received from the reader and determine whether to respond based on the magnitude of the signal received from the reader and a control signal.

Figure 5:
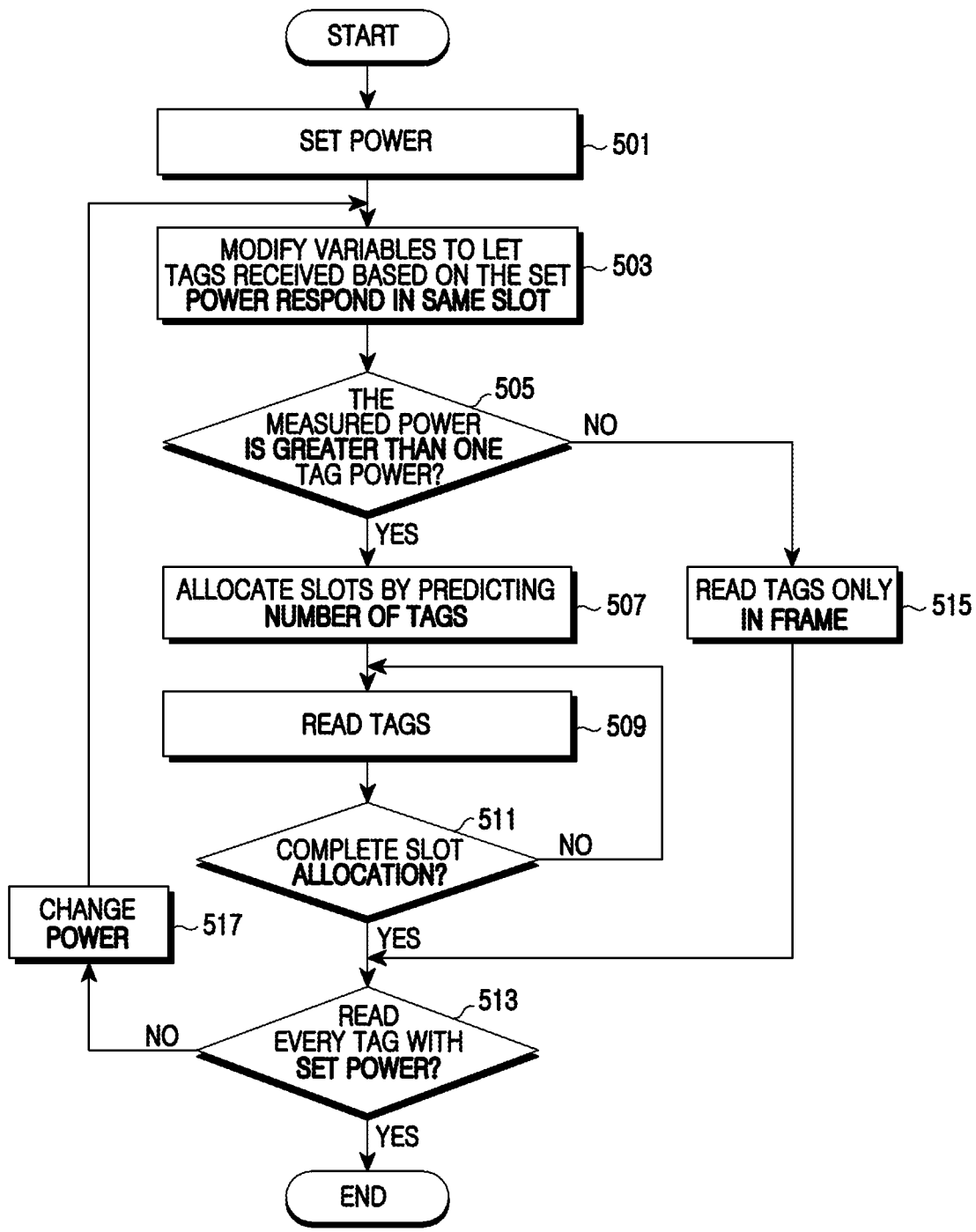
FIG. 5 is a flowchart illustrating operations of an RFID reader for ant-collision tag when a distance between a reader and a tag exceeds 2 m or when a tag response power is not in proportion to the distance according to an exemplary embodiment of the present invention.

FIG. 5 is a flowchart illustrating operations of an RFID reader for ant-collision tag when a distance between the reader and the tag exceeds 2 m or when the tag response power is not in proportion to the distance according to an exemplary embodiment of the present invention.

Referring to FIG. 5, the RFID reader 210 sets the response power of the RFID tag in step 501 and makes the condition such that only RFID tags in the set power range can respond. In step 503, the RFID reader 210 modifies the variables of the RFID reader 210 so that the RFID tags can respond in the same slot according to the set tag response power.

Next, the RFID reader 210 measures the power of the RFID tags received in the one slot. In step 505, the RFID reader 210 determines whether the measured power is greater than one RFID tag power. When the measured power is not greater than one RFID tag power, the RFID reader 210 reads the RFID tags only in one frame in step 515 and proceeds to step 513.

By contrast, when the measured power is greater than one RFID tag power, the RFID reader 210 predicts the number of the RFID tags based on the measured power and allocates slots as many as the predicted RFID tags in step 507. In step 509, the RFID reader 210 reads the RFID tags in the allocated slots.

In step 511, the RFID reader 210 determines whether the slot allocation is completed. When the slot allocation is not completed yet, the RFID reader 210 returns to step 509.

When the slot allocation is completed, the RFID reader 210 determines whether every intended tag is read with the set power in step 513. Upon reading every intended tag with the set power, the RFID reader 210 finishes this process.

When all of the intended tags are not read with the set power, the RFID reader 210 alters the response power of the tag in step 517 and returns back to step 503.

FIG. 6 is a diagram illustrating a method for predicting the number of tags based on measured power according to an exemplary embodiment of the present invention.

Referring to FIG. 6, the RFID reader 210 defines the variables such that every RFID tag can response in the first slot, then measures the power of the received RFID tags, predicts the number of the RFID tags based on the measured power using a pre-calculated mapping table, allocates slots, and reads the RFID tags.

As set forth above, the variables are modified to simultaneously read every tag responding to the reader of the RFID system and the slots as many as the tags predicted based on the received tag power are allocated. Therefore, the tag collision can be avoided and the time and power consumption can be optimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a reader for preventing a tag collision in a Radio Frequency IDentification (RFID) system, the method comprising:
    modifying variables in a signal from the reader such that every tag that receives the signal responds in a same slot comprising a regular time interval such that all the received RFID tags collide in the slot;
    measuring a total power of the tags received in the same slot;
    predicting a number of the tags based on the measured power;
    allocating slots according to the predicted number; and
    reading the tags in the allocated slots.

2. The method of claim 1, wherein the predicting of the number of tags comprises:
    predicting the number of the tags based on the measured power by using a pre-calculated mapping table.

3. The method of claim 1, further comprising:
    storing a pre-calculated mapping table into a memory to predict the number of the tags based on the measured power.

4. The method of claim 1, wherein the variables comprise a response power range such that only a tag that receives the signal from the reader with a received signal power in a predefined range according to the response power range responds.

5. The method of claim 4, wherein, when fewer than all of the tags are read at the reader with the response power range, the reader changes the response power range.

6. An apparatus of a reader for preventing a tag collision in a Radio Frequency IDentification (RFID) system, the apparatus comprising:
    a controller for modifying variables in a signal from the reader such that every tag that receives the signal responds in a same slot comprising a regular time interval such that all the received RFID tags collide in the slot, for controlling to measure a total power of the received tags, for predicting a number of the tags based on the measured power, and for allocating slots according to the predicted number; and
    a power measurer for measuring the power of the received tags responding in the same slot.

7. The apparatus of claim 6, wherein the controller controls to read the tags in the allocated slots.

8. The apparatus of claim 6, further comprising:
    a memory for storing a mapping table pre-calculated to predict the number of the tags based on the measured power.

9. The apparatus of claim 6, wherein the variables comprise a response power range such that only a tag that receives the signal from the reader with a received signal power in a predefined range according to the response power range responds.

10. The apparatus of claim 6, wherein, when fewer than all of the tags are read at the reader with the response power range, the reader controller changes the response power range.

\* \* \* \* \*